United States Patent [19]
Iijima et al.

[11] Patent Number: 6,033,448
[45] Date of Patent: Mar. 7, 2000

[54] METHOD FOR THE MANUFACTURE OF A LOW WATER CONTENT GASIFIED FUEL FROM RAW FUELS

[75] Inventors: Masaki Iijima; Satoshi Uchida; Osamu Shinada, all of Tokyo, Japan

[73] Assignee: Mitsubishi Heavy Industries, Ltd., Tokyo, Japan

[21] Appl. No.: 08/797,586

[22] Filed: Feb. 8, 1997

[30] Foreign Application Priority Data

Feb. 13, 1996 [JP] Japan .................................... 8-025067
Mar. 22, 1996 [JP] Japan .................................... 8-066475

[51] Int. Cl.$^7$ .................................. C10J 3/00; C10J 1/28
[52] U.S. Cl. ........................................... 48/211; 48/197 R
[58] Field of Search ................................ 48/211, 197 R; 208/187, 188; 204/666; 44/301

[56] References Cited

U.S. PATENT DOCUMENTS

| | | | |
|---|---|---|---|
| 3,232,728 | 2/1966 | Reynolds | 48/215 |
| 4,075,831 | 2/1978 | McGann | 60/39.05 |
| 4,087,258 | 5/1978 | Baron et al. | 48/197 R |
| 4,101,294 | 7/1978 | Kimura | 48/77 |
| 4,581,120 | 4/1986 | Sublette | 204/666 |
| 4,919,777 | 4/1990 | Bull | 204/563 |
| 4,923,483 | 5/1990 | Layrisse et al. | 44/301 |
| 5,041,144 | 8/1991 | Lath | 48/197 R |
| 5,441,548 | 8/1995 | Brandl et al. | 48/215 |

FOREIGN PATENT DOCUMENTS

| | | | |
|---|---|---|---|
| 28 07 227 | 8/1979 | Germany | C10K 1/34 |
| 40 32 045 | 4/1992 | Germany | C10C 3/04 |
| 4342669 | 6/1995 | Germany | C10K 1/00 |
| 9103041 | 3/1991 | WIPO | G10G 33/04 |

*Primary Examiner*—Hien Tran
*Attorney, Agent, or Firm*—Michael D. Rechtin; Foley & Lardner

[57] ABSTRACT

The present invention provides a method for manufacturing a gasified fuel. The fuel is gasified by partial oxidation of a fuel layer obtained from a raw fuel which contains water and has decreased viscosity. The fuel layer is subjected to partial oxidation by being exposed to oxygen, producing a gasified fuel having a low water content. The separation of the raw fuel into a water layer and a fuel layer can be accelerated by adding an emulsion breaker to the raw fuel or by applying an electric field.

7 Claims, 3 Drawing Sheets

6,033,448

METHOD FOR THE MANUFACTURE OF A LOW WATER CONTENT GASIFIED FUEL FROM RAW FUELS

FIELD OF THE INVENTION

The present invention relates to a method for manufacturing gasified fuel from raw fuel, and more specifically, to a method of manufacturing a low water content gasified fuel from a raw fuel which contains water. Also, the present invention relates to a method and apparatus for heat recovery in manufacturing gasified fuel, and more specifically, a process wherein a gasified fuel is cooled to a temperature below the temperature at which water vapor condenses, and sulfur compounds are absorbed and separated from the cooled gas by an absorbent.

BACKGROUND OF THE INVENTION

Conventionally, a method has been used in which a raw fuel such as coal, heavy oil, and OLIMULSION™ is partially oxidized into a gasified fuel. The gasified fuel is used as the fuel for gas turbines, etc. In recent years, various new fuels have been used as raw fuels.

For example, a technology for utilizing a natural tar called Olinoco tar as a fuel has been developed. Olinoco tar, which is obtained at the basin of the River Olinoco in Venezuela, South America, has a high viscosity in its normal state. Despite this high viscosity, Olinoco tar has a sufficient heating value, exhibiting properties of super-heavy oil. As shown in FIG. 2, Olinoco tar can be classified according to specific gravity (unit in the oil industry: API Baume degree); the lower the specific gravity, the higher the viscosity (kinematic viscosity). Therefore, Olinoco tar has the common characteristic in that its viscosity decreases with an increase in its temperature, though different specific gravity gives different temperature-viscosity characteristics.

Because Olinoco tar has such a high specific gravity at low temperatures, special methods are used for extraction and transportation of the tar. For the extraction, water is poured in Olinoco tar, and water and a surface active agent are added for getting an emulsion with a decrease in the high viscosity of the natural tar, which enables pumping-up and transportation of the emulsion by pipeline, etc. An emulsion obtained by adding water (about 30%) and a surface active agent to natural Olinoco tar (about 70%) has been commercialized as OLIMULSION™ (registered trade name of Bitumens Olinoco S.A.).

However, when a raw fuel is gasified and used as a gasified fuel, the gasification of the fuel is carried out at a high temperature of several hundred degrees centigrade. Therefore, when the raw fuel contains large quantities of water or it has water added to it prior or during gasification, the quantity of heat required for gasification is greatly increased, as a greater amount of heat is used to for heating or evaporating a large amount of water during gasification. Furthermore, when excess water is present in the fuel to be gasified, the size of the facility required to process the fuel into a gasified fuel increases. Additionally, the presence of excess water in the fuel to be gasified can lead to corrosion of the facility used, due to the generation of corrosive materials such as hydrogen chloride gas, which dissolve in condensed water.

Previously, natural Olinoco tar has been used as an emulsion when used as a fuel, such that the emulsion contains about 30% water. When this emulsion is then gasified in the presence of oxygen, the resulting gasified fuel contains about 14% water. Therefore, when this gas is cooled in order to remove impurities in the gas such as hydrogen sulfide, water is condensed and lost, resulting in a large heat loss. Moreover, since large quantities of water are contained in the gasified gas, sulfur content cannot be removed sufficiently by the dry gas refining method which utilizes iron oxide, etc.

Furthermore, when a raw fuel has a high water content, or has water added prior to gasification, the resultant gasified fuel has a high temperature above several hundred degrees centigrade and contains a large quantity of water vapor and sulfur compounds such as hydrogen sulfide. When desulfurization is carried out by bringing the gasified fuel into contact with an absorbent which is typically an amine, the gasified fuel must be cooled to a temperature close to ambient temperature to enhance the absorbing efficiency so that acidic gases such as hydrogen sulfide and carbon dioxide are absorbed. For this reason, high-temperature gasified fuel is cooled by using cooling water by means of a heat exchanger, and therefore the heat of condensation generated when water vapor turns to liquid water is lost.

SUMMARY OF THE INVENTION

An object of the present invention is to provide a method for manufacturing gasified fuel, in which a raw fuel which contains water and has decreased viscosity can be gasified, such that water is removed from the raw fuel prior to gasification, such that a gasified fuel having a low water content can be produced.

Another object of the present invention is to provide a method and apparatus for heat recovery in manufacturing gasified fuel, in which the heat of condensation of water vapor dissipated in cooling a high-temperature gasified fuel can be recovered and restored to the gasified fuel.

DETAILED DESCRIPTION

The inventors earnestly studied the methods for manufacturing gasified fuel from a raw fuel containing water, such that the raw fuel had a decreased viscosity over its natural state. As the result of the study, the inventors found that a raw fuel which contains water and has decreased viscosity can be separated into a water layer and a fuel layer. It was further found that the fuel layer obtained by this separation could be partially oxidized by oxygen to produce a gasified fuel, by which the aforementioned problems can be solved, to arrive at the present invention.

The present invention provides a method for manufacturing a gasified fuel. This gasified fuel is made by partial oxidation of a portion of a raw fuel. The raw fuel, which has a decreased viscosity and contains water, is separated into a fuel layer and a water layer. The fuel layer is separated from the water layer, and the fuel layer is heated in the presence of oxygen to produce a gasified fuel having a low water content.

In the present invention, a raw fuel which contains water and has decreased viscosity (hereinafter referred simply to as a raw fuel) means a fuel in which a fuel such as crude oil, heavy oil, super-heavy oil, and oil sand is made into a water emulsion. The resulting emulsion has viscosity of a degree such that the raw fuel can be transported by a pump or burned by a burner. That is, the viscosity of this raw fuel at ambient temperature is 50 to 100 centipoises.

For example, OLIMULSION™ is a reduced viscosity raw fuel which is produced by pouring water into Olinoco tar, and then by adding water and a surface active agent. OLIMULSION™ contains about 70% Olinoco tar and about 30% water, and its viscosity is 50 to 100 centipoises at ambient temperature.

Figure 2:
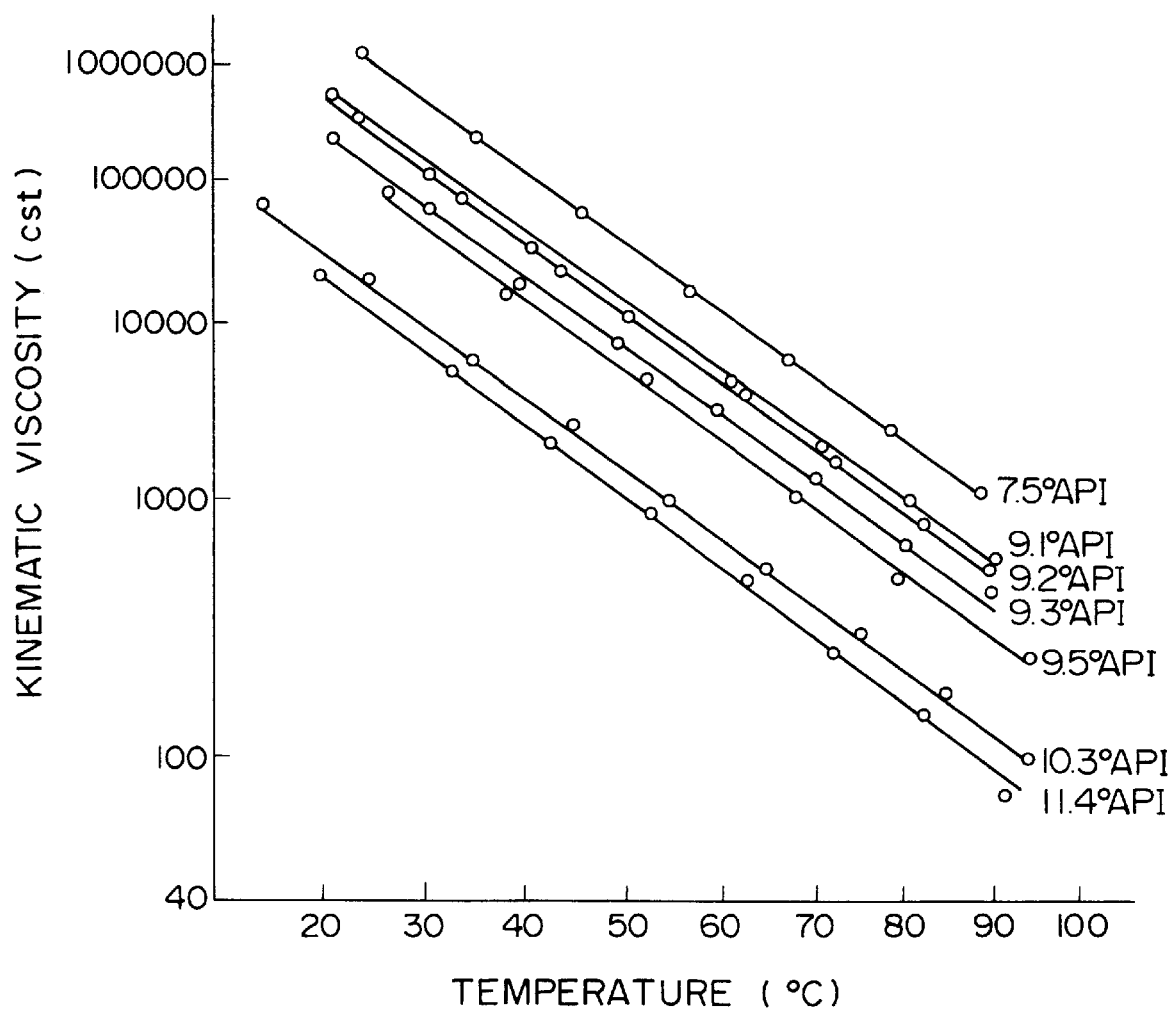
FIG. 2 is a temperature-viscosity characteristic diagram for Olinoco tar, a raw fuel suitable for use in the process of the present invention.

However, the viscosity of fuel such as Olinoco tar is as shown in FIG. 2, and the fuel exhibits sufficient flowability at temperatures above 100° C., preferably above 120° C. to allow its transport and use. Even after water is separated from the raw fuel, the fuel layer has flowability of a degree such that it can be transported by a pump, or a gasified fuel can be obtained by partially oxidizing it by a burner.

Separation of water from a raw fuel is effected by heating the raw fuel to a temperature above 150° C., preferably at 150° C. to 180° C., to separate the raw fuel into a water layer and a fuel layer. The layers are separated by effecting liquid-liquid separation by using the difference in specific gravity in the layers after being allowed to stand. Heating is effected in a pressurized state to prevent water from boiling.

Figure 1:
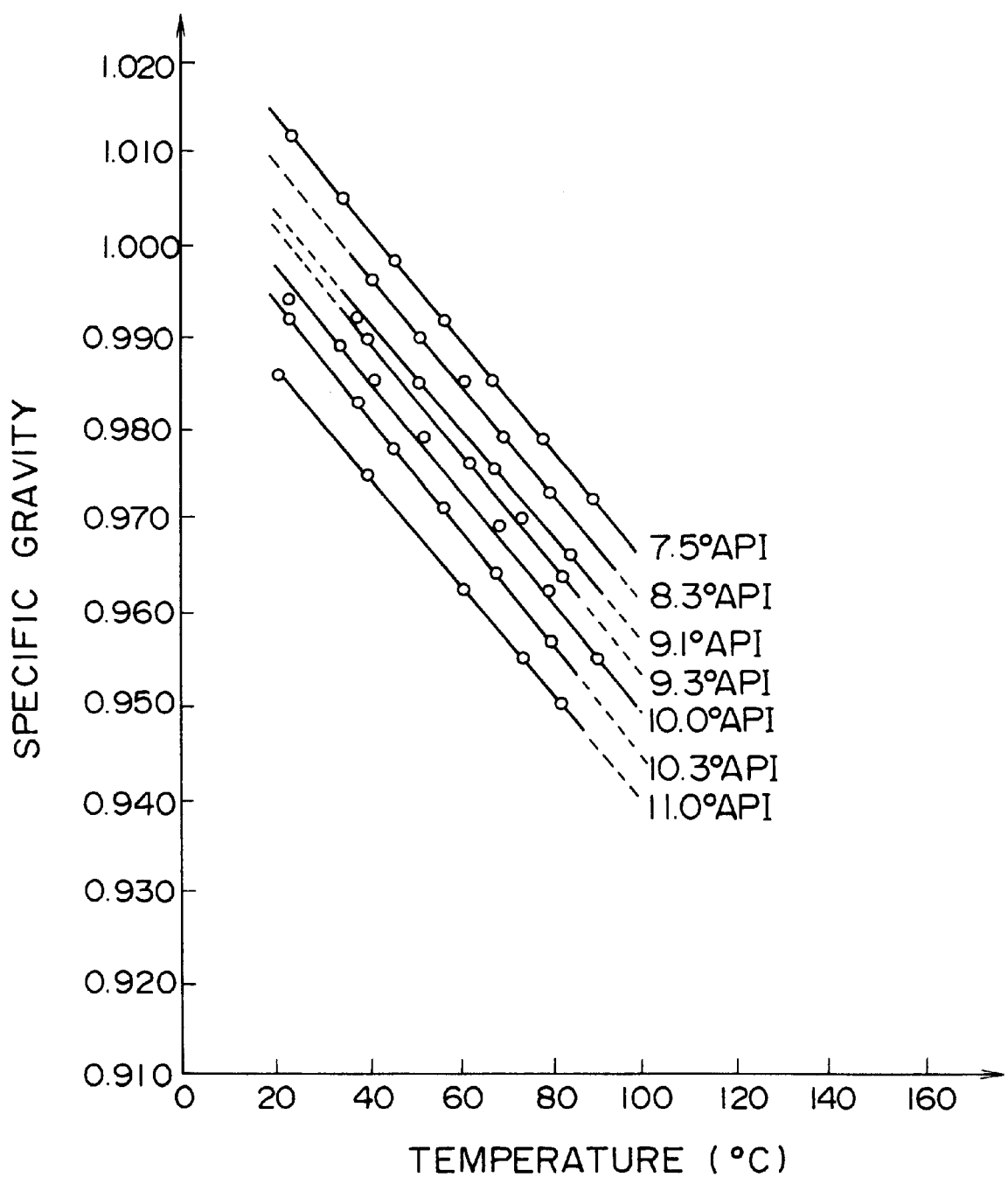
FIG. 1 is a temperature-specific gravity characteristic diagram for Olinoco tar, a raw fuel suitable for use in the process of the present invention.

Olinoco tar has different characteristics depending on its type as shown in FIG. 1 (classify according API Baume degree), but it is common in that the specific gravity (here, ordinary specific gravity) decreases significantly with an increase in temperature. Since the specific gravity of water does vary greatly with changes in temperature, the difference in specific gravity between Olinoco tar and water increases when the temperature of Olinoco tar increases, so that the separation becomes easy. This is clearly shown in FIG. 1 which illustrates that various Olinoco tars have specific gravities of about 0.970 in 100° C.

When a raw fuel is heated, the separation of the raw fuel into a fuel layer and a water layer can be accelerated by adding an emulsion breaker. The emulsion breaker used is dependent on the type of surface active agent used in the raw fuel. The surface active agent in the raw fuel may be a cation or anion type surface active agent, and the reverse ion type is used as the emulsion breaker, If a nonionic surface active agent is used in the raw fuel, a compound to which alcohol, ether, fatty acid ester, ethylene glycols, silicone oil, etc. is added is used as the emulsion breaker.

The separation of the raw fuel into a water layer and a fuel layer is accelerated by applying an electric field to the heated raw fuel. The electric field can be applied in a settling vessel such as a dehydrator. The dehydrator, which is, for example, of an electrostatic type, has many electrodes in a drum-shaped vessel and separates the raw fuel emulsion into a fuel layer and a water layer by applying an electric field by a DC or AC voltage between these electrodes and the drum body. The principle of acceleration of water separation due to application of electric field is that the water molecule has a dipole, and when an electric field is applied to this dipole, the water molecules are arranged readily, so that they are aggregated easily. Thereby, the emulsion state is destroyed, by which the separation of the raw fuel into a fuel layer comprising Olinoco tar and a water layer comprising water is effected.

As described above, the separation of water can be effected by heating only, by the combination of heating and an emulsion breaker, by the combination of heating and application of electric field, or by the combination of heating, an emulsion breaker, and application of electric field.

By the aforementioned separation of water, the water content in the fuel layer can be decreased usually to a value below 3%, preferably to 1.0 to 1.5%.

The gasified fuel is a gaseous fuel obtained by partially oxidizing various raw fuels in a reducing atmosphere by using oxygen (in this specification, the term "oxygen" is defined as an oxygen-containing gas such as air) in a gasifying device. The gasified fuel contains hydrogen and carbon monoxide as main components and also contains carbon dioxide, water, nitrogen, sulfur compounds such as hydrogen sulfide and carbonyl sulfide, or ammonia, hydrogen chloride, etc. and further sometimes contains soot and dust.

In the present invention, the raw fuel is separated into a water layer and a fuel layer at the stage just before gasification, liquid-liquid separation is effected to produce the layers, and only the fuel layer is gasified. The stage just before gasification means that the fuel layer from which water is substantially separated is used immediately in the next partial oxidation process. A strainer, a heat exchanger, etc., and an agitator, etc., may be interposed between the process in which separation into a water layer and a fuel layer is effected, and the partial oxidation process.

The gasified fuel obtained by partial oxidation may be pressurized, be under ordinary pressure, or be decompressed, but it is obtained usually in a pressurized state of several atmospheres to several tens of atmospheres, and it contains water of about 2 to 5 vol %.

In the above-described configuration, wherein the fuel is heated to a high temperature just before the gasification system, water is removed by, for example, a dehydrator. Therefore, the viscosity of the fuel layer is sufficiently low even with the removal of water, so that smooth supply of the fuel layer to the gasification system is possible.

According to the present invention, even a fuel to which water is added to decrease the viscosity can be partially oxidized after water is separated. Therefore, the water content in the gasified fuel is reduced significantly, and the size of the facility required after the partial oxidation reactor can be greatly decreased.

Also, the inventors discovered that when a high-temperature gasified fuel is cooled by a saturator to a temperature below the temperature at which water vapor condenses, and water is poured in the desulfurized gasified fuel and such fuel is heated by the saturator, the heat of condensation of water vapor dissipated in cooling is efficiently recovered by the desulfurized gasified fuel.

A first mode of the present invention provides a heat recovery method in manufacturing gasified fuel, characterized in that a gasified fuel containing water vapor and sulfur compounds, which is obtained by partially oxidizing fuel by using oxygen, is cooled by a saturator to a temperature below the temperature at which water vapor condenses, the cooled gasified fuel is brought into contact with an absorbent and the sulfur compounds are absorbed and separated to obtain a desulfurized gasified fuel, and then water is added to the desulfurized gasified fuel and the fuel is heated by the saturator.

A second mode of the present invention provides a heat recovery apparatus which comprises a saturator for cooling a gasified fuel containing water vapor and sulfur compounds, which is obtained by partially oxidizing fuel by using oxygen, by a saturator to a temperature below the temperature at which water vapor condenses, a desulfurizing device for bringing the cooled gasified fuel into contact with an absorbent to absorb and separate the sulfur compounds, and a cooling device before desulfurization in which water is added to the desulfurized gasified fuel after the desulfurized gasified fuel is obtained, and in which water is added to the desulfurized gasified fuel and the fuel is heated by the saturator.

Figure 3:
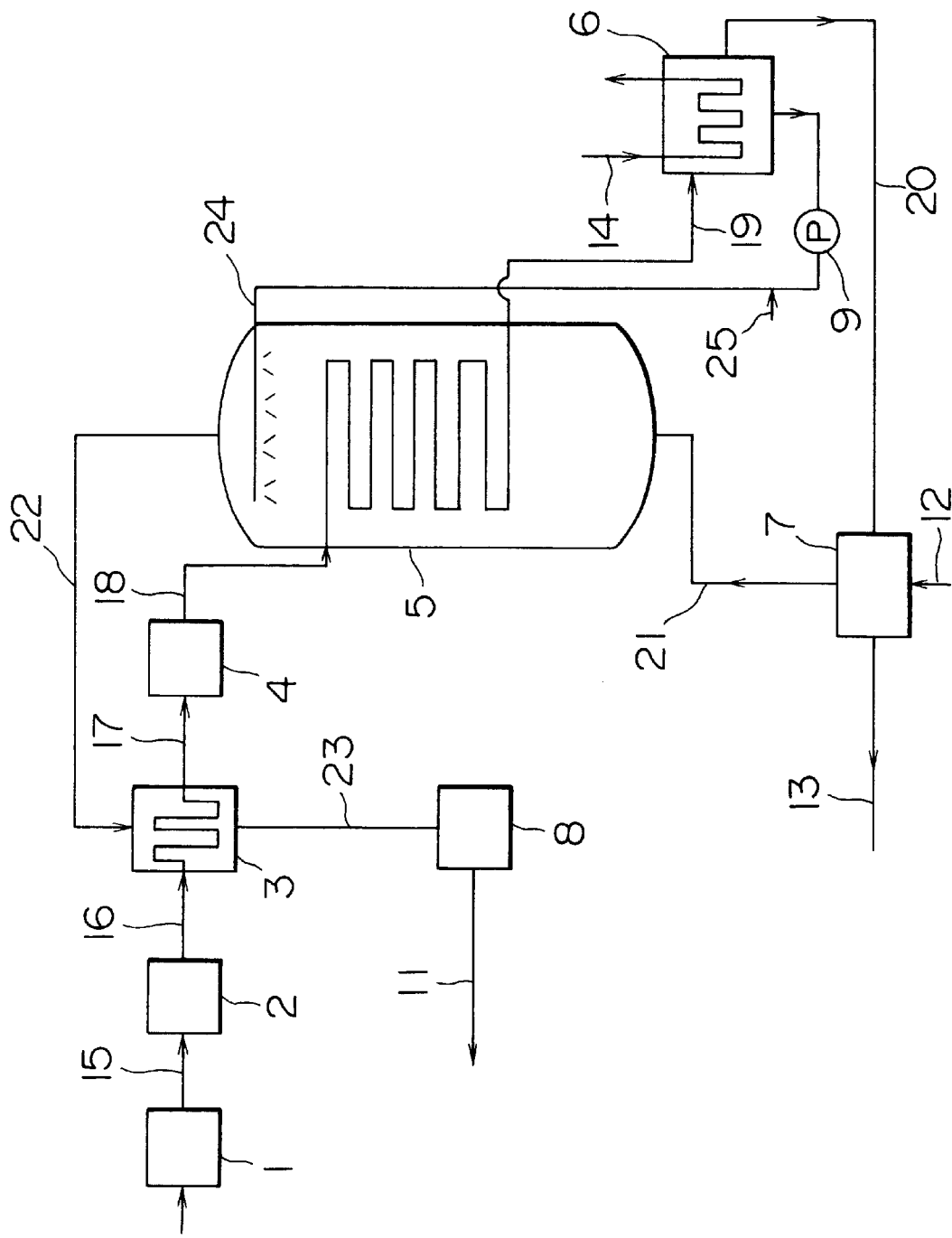
FIG. 3 is a schematic view of a heat recovery apparatus in accordance with the present invention.

FIG. 3 is a schematic view of a heat recovery apparatus in accordance with the present invention. In FIG. 3, reference numeral 1 denotes a raw fuel gasifying device. To this raw fuel gasifying device are connected a dust removing device 2, a heat exchanger 3 before reduction of carbonyl sulfide, a carbonyl sulfide reducing device 4, a saturator 5, a cooling device 6 before desulfurization, and a desulfurizing device 7 in sequence. A gas turbine 8 is connected to the heat exchanger 3 before reduction of carbonyl sulfide. The desulfurizing device 7 is also connected to the saturator 5. The cooling water from the cooling device 6 before desulfurization is supplied to the top of the saturator 5 by a pump 9. Reference numeral 11 denotes exhaust gas discharged from the gas turbine 8, 12 denotes a sulfur compound absorbent supplied to the desulfurizing device 7, 13 denotes gas such as hydrogen sulfide and carbon dioxide discharged from the desulfurizing device 7, and 14 denote cooling water.

In the present invention, the gasified fuel is a gaseous fuel obtained by partially oxidizing a raw fuel such as crude oil, heavy oil, coal, OLIMULSION™, oil sand, and oil slurry in a reducing atmosphere by using air or oxygen (hereinafter both are called oxygen) in the raw fuel gasifying device 1. The gasified fuel contains hydrogen, carbon monoxide, carbon dioxide, water, nitrogen, sulfur compounds such as hydrogen sulfide and carbonyl sulfide, or ammonia, hydrogen chloride, etc. and sometimes contains oxygen and further sometimes contains soot and dust.

The gasified fuel obtained by partial oxidation has a high temperature of several hundred degrees centigrade, and may be pressurized, may be under ordinary pressure, or may be decompressed. Usually, it is obtained in a pressurized state of several atmospheres to several tens of atmospheres, and it contains water of about 2 to 20 vol %. Therefore, the temperature at which water vapor condenses is determined by water content and pressure.

The saturator 5 used in the present invention can heat-exchanging (A) high-temperature side fluid containing water vapor and (B) low-temperature side fluid containing water by a heat transfer wall in terms of sensible heat and latent heat, and the heat of condensation of water vapor in (A) is converted into the heat of evaporation of water in (B). Then, by using the desulfurized gasified fuel as the low-temperature side fluid, energy is concentrated to one gasified fuel, so that the gasified fuel can efficiently be used for the gas turbine, etc.

The type of the saturator 5 includes, for example, a tube type heat exchanger separated into a shell side and a tube side, which may be of single tube type or multiple tube type. A high-temperature gas is made to pass on the shell side, and a low-temperature gas and water are poured on the tube side, by which evaporation may be accelerated by boiling heat transfer, or the reverse case may be possible.

The condensed water produced when the gasified fuel is cooled in the cooling device 6 before desulfurization or the water from the outside may be used for the saturator, by which the energy concentration to the gasified fuel can be increased. FIG. 3 shows an example in which the condensed water is used. In this case, make-up water 25 may be supplied if necessary, if the amount of water produced from the condensation is insufficient.

When a corrosive matter is contained in the gas before desulfurization, condensed water is produced containing such corrosive substances. Therefore, the materials used to make the devices after the saturator 5 are selected by considering corrosion factors. These materials may be carbon steel, molybdenum steel, chrome-molybdenum steel, austenitic stainless steel, ferritic stainless steel, nickel alloys, etc.

When the gasified fuel obtained by partial oxidation contains soot and dust, it is preferable that soot and dust be removed by using the dust removing device 2, which may be, for example, a cyclone, electric dust collector, and filter. Thereby the levels of soot and dust of several ten thousand ppm can be decreased to several ppm.

When the dust-removed gasified fuel contains carbonyl sulfide, it is cooled to a suitable temperature by the heat exchanger 3 before reduction of carbonyl sulfide. In this case, cooling can preferably be effected by the desulfurized gasified fuel which has passed the saturator.

When the gasified fuel contains carbonyl sulfide, it is reduced to hydrogen sulfide in advance in the presence of catalyst in the carbonyl sulfide reducing device 4, by which sulfur compounds are removed in the subsequent desulfurizing process. As the catalyst, for example, alumina series catalyst is used.

The gasified fuel, in which dust is removed and carbonyl sulfide is reduced to hydrogen sulfide as described above, still has a high temperature of 200 to 400° C., and also has much sensible heat and latent heat due to water. Therefore, heat exchanging is performed by contacting the desulfurized gasified fuel with the saturator 5.

The gasified fuel-condensed water mixture after heat exchanging in the saturator 5 is further cooled to a temperature suitable for the desulfurizing process, for example, 60° C. to 30° C., by bringing it into contact with a cooled medium in the cooling device 6 before desulfurization if necessary. The cooling of the medium in the cooling device 6 before desulfurization may be effected by heat exchanging with cooling water, or can be effected by a liquid absorbing sulfur compounds. For example, the heat exchange is effected by making an absorbent flow on the shell side or the tube side and making the gasified fuel-condensed water mixture pass on the tube or shell side. Thereby, the heat of the gasified fuel-condensed water mixture after being heat exchanged in the saturator can be turned into heating energy when the absorbent absorbing sulfur compounds is regenerated. The cooling may be effected at one stage, or can be effected in multiple stages.

The gasified fuel-condensed water mixture cooled to a temperature suitable for the desulfurizing process comes in contact with the absorbent in the desulfurizing device 7, by which sulfur compounds such as hydrogen sulfide are absorbed and removed. As the absorbent, for example, amine series absorbent can be used. The amine series absorbent is water soluble, and may contain water.

The absorbent sulfur compounds are regenerated by discharging acidic gases such as hydrogen sulfide and carbon dioxide by heating, decompression, etc.

The desulfurized gasified fuel after being heat exchanged in the saturator, or the desulfurized gasified fuel after being heat exchanged with the gasified fuel after dust is further removed, is used as a fuel for the gas turbine 8, a fuel cell, etc., after small amounts of sulfur compounds and gases such as hydrogen chloride are further removed as necessary.

The present invention can be carried out in a batch mode, semi-batch mode, or continuous mode.

As described above, according to the present invention, the heat of condensation dissipated when a gasified fuel containing large quantities of water is cooled to a temperature necessary for the desulfurizing process can be recovered efficiently.

The method of the present invention will be explained specifically by a description of the following working examples.

EXAMPLE 1

An example using OLIMULSION™ is described. OLIMULSION™ (water content 29%) was liquidized by mixing natural Olinoco tar (70%) with water (30%) containing small amounts of sulfonic acid type surface active agent, and was stored in a tank. The temperature of the OLIMULSION™ in the tank was 20° C. to 30° C., which is close to the ambient temperature. This OLIMULSION™ was pressurized to about 20 kg/cm$^2$ by a pump, and supplied to a heat exchanger. The heat source for the heat exchanger was high-temperature water removed by a later-described dehydrator, being heated to 50° C. to 60° C. The OLIMULSION™ was further heated to 150° C., and the heated OLIMULSION™ was supplied to the dehydrator and allowed to stand, and then it was separated into a fuel layer at the upper layer and a water layer at the lower layer. This was liquid-liquid separated to obtain a fuel layer containing about 2.0% water content. This fuel layer was further heated and partially oxidized by using a partial oxidation reactor. Thus, a gasified fuel containing hydrogen and carbon monoxide as main components and containing hydrocarbon, water, hydrogen sulfide, etc. was obtained.

Alternatively, the separated water was supplied to the heat exchanger as described above, treated after heat exchange, and discharged to the outside of the system.

EXAMPLE 2

A cation type emulsion breaker of an amount exceeding the equivalent amount of surface active agent was added to the OLIMULSION™ used in Example 1, and the OLIMULSION™ was heated to 50° C. and agitated. It was further heated to 150° C. and supplied to the dehydrator, where it was allowed to stand, and then separated into a water layer and a fuel layer. The fuel layer was made to overflow and then supplied to the partial oxidation reactor. The water content in the fuel layer was about 1.8%.

EXAMPLE 3

A cation type emulsion breaker of an amount exceeding the equivalent amount of surface active agent was added to the OLIMULSION™ used in Example 1, and the OLIMULSION™ was heated to 50° C. and agitated. It was further heated to 120° C. in an extracting vessel and agitated by adding heavy oil. After the separation into a water layer and a fuel layer was accelerated, the OLIMULSION™ was supplied into a precipitate separating tank. After the supernatant fuel layer was made to overflow, it was supplied into the partial oxidation reactor. The water content in the fuel layer was about 1.6%.

EXAMPLE 4

The dehydrator used in Example 2 was changed to an electrostatic type having many electrodes in a drum-shaped vessel. A 200 V DC voltage was applied between these electrodes and the drum body of the vessel in order to accelerate separation by applying an electric field. The overflowing fuel layer contained a water content of 1.5%. The fuel layer was further heated to 150° C. and supplied into the partial oxidation reactor for partial oxidation, by which a gasified fuel containing hydrogen and carbon monoxide as main components and containing hydrocarbon, water and gases containing hydrogen sulfide etc. was obtained.

Table 1 gives the composition and higher heating value (wet) before gasification of raw OLIMULSION™ and dehydrated OLIMULSION™ obtained by separating water from raw OLIMULSION™. Table 2 gives the gas composition and higher and lower heating values (wet) of the fuel gases obtained by gasifying these materials.

TABLE 1

| Composition wt % | OLIMULSION™ | Dehydrated OLIMULSION™ |
|---|---|---|
| Carbon | 59.83 | 83.06 |
| Hydrogen | 7.48 | 10.38 |
| Oxygen | 0.20 | 0.28 |
| Nitrogen | 0.50 | 0.69 |
| Sulfur | 2.69 | 3.74 |
| Ash | 0.25 | 0.35 |
| Water | 29.05 | 1.50 |
| Total | 100.0 | 100.0 |
| Higher heating value HHV (kcal/kg) | 7113 | 9875 |

TABLE 2

| Gas composition | OLIMULSION™ | Dehydrated OLIMULSION™ |
|---|---|---|
| vol % | Gasified fuel | gasified fuel |
| Hydrogen | 36.404 | 38.407 |
| Oxygen | 0.000 | 0.000 |
| Nitrogen & ammonia | 0.729 | 0.856 |
| Water | 13.717 | 3.064 |
| Cabonmonoxide | 43.143 | 55.014 |
| Carbon dioxide | 4.437 | 0.820 |
| Argon | 0.762 | 0.894 |
| Methane | 0.005 | 0.002 |
| Hydrogen sulfide | 0.683 | 0.803 |
| Carbonyl sulfide | 0.120 | 0.140 |
| Sulfur dioxide | 0.000 | 0.000 |
| Total | 100.00 | 100.00 |
| Specific weight (kg/Nm$^3$) | 0.8056 | 0.8054 |
| Higher heating value HHV(kcal/kg) | 2460 | 2887 |
| Lower heating value LHV (kcal/kg) | 2286 | 2703 |

As seen from this result, the gasified fuel obtained from dehydrated OLIMULSION™ has a low water content and a high heating value.

EXAMPLE 5

In the following Example, the invention was carried out by using the aforementioned heat recovery apparatus shown in FIG. 3.

OLIMULSION™ containing 29% water was used as a raw fuel. The following Tables 3 and 4 give the composition, temperature, etc. of gasified fuel obtained by partial oxidation using oxygen.

TABLE 3

| | Fluid | | | | |
|---|---|---|---|---|---|
| | 15 | 16 | 17 | 18 | 19 |
| Temperature ° C. | | | | | |
| | 450 | 450 | 300 | 300 | 70 |
| Pressure atm | | | | | |
| Composition | 26.0 | 25.5 | 25.3 | 25.0 | 24.8 |
| $H_2$ (vol %) | 37.0 | 37.0 | 37.0 | 37.0 | 42.3 |
| CO | 43.4 | 43.4 | 43.4 | 43.4 | 49.7. |
| $CO_2$ | 4.4 | 4.4 | 4.4 | 4.4 | 5.0 |
| $H_2O$ | 13.7 | 13.7 | 13.7 | 13.7 | 1.3 |
| $H_2S$ | 0.7 | 0.7 | 0.7 | 0.8 | 0.9 |
| COS | 0.1 | 0.1 | 0.1 | 5 ppm | 5 ppm |
| $N_2$ | 0.7 | 0.7 | 0.7 | 0.7 | 0.8 |
| $O_2$ | 0.0 | 0.0 | 0.0 | 0.0 | 0.0 |
| Total (vol %) | 100 | 100 | 100.0 | 100.0 | 100.0 |

TABLE 4

| | Fluid | | | | |
|---|---|---|---|---|---|
| | 20 | 21 | 22 | 23 | 24 |
| Temperature ° C. | | | | | |
| | 40 | 40 | 240 | 390 | 40 |
| Pressure atm | | | | | |
| Composition | 24.6 | 24.0 | 23.8 | 23.6 | 24.0 |
| $H_2$ (vol %) | 42.0 | 43.1 | 37.9 | 37.9 | 37.9 |
| CO | 50.2 | 50.7 | 44.4 | 44.4 | 44.4 |
| $CO_2$ | 5.1 | 5.1 | 4.5 | 4.5 | 4.5 |
| $H_2O$ | 0.3 | 0.3 | 12.4 | 12.4 | 12.4 |
| $H_2S$ | 0.9 | 15 ppm | 15 ppm | 15 ppm | 15 ppm |
| COS | 5 ppm | 5 ppm | 5 ppm | 5 ppm | 5 ppm |
| $N_2$ | 0.8 | 0.8 | 0.7 | 0.7 | 0.7 |
| $O_2$ | 0.0 | 0.1 | 0.1 | 0.1 | 0.1 |
| Total (vol %) | 100 | 100 | 100.0 | 100.0 | 100.0 |

As shown in FIG. 3, the heat recovery apparatus in accordance with this embodiment comprises a raw fuel gasifying device 1, a dust removing device 2 connected sequentially to the raw fuel gasifying device 1, a heat exchanger 3 before reduction of carbonyl sulfide, a carbonyl sulfide reducing device 4, a saturator 5, a cooling device 6 before desulfurization, a desulfurizing device 7, and a gas turbine 8 connected to the heat exchanger 3 before reduction of carbonyl sulfide, and is configured so that the desulfurizing device 7 is connected to the saturator 5 and cooling water from the cooling device 6 before desulfurization is supplied to the top of the saturator 5 by a pump 9. Reference numerals 15 to 24 in FIG. 3 denote fluids having a composition given in Tables 3 and 4. Accordingly, by the heat exchange in the saturator 5, the gasified fuel 18 (300° C., water content 13.7 vol %) before desulfurization is heat-recovered as the desulfurized gasified fuel 22 (240° C., water content 12.4 vol %) in spite of desulfurizing operation at a low temperature.

The above description of the present invention has been an explanation of embodiments in the case of OLIMULSION™, but the present invention is not limited to the case of OLIMULSION™. The present invention can, needless to say, be applied to all liquid fuels from super-heavy oil which must be made into a flowable liquid by adding water because it generally has high viscosity. The above description has been given regarding super-heavy oil of an API Baume degree below 10, but the raw fuel in the present invention includes one with an API Baume degree of 10 to 20, which is called a heavy oil.

We claim:

1. A method for manufacturing a gasified fuel from raw fuel, comprising:

(a) separating the raw fuel into a fuel layer and a water layer and removing the water layer;

(b) adding oxygen to the fuel layer only to partially oxidize the fuel layer;

(c) gasifying the partially oxidized fuel layer to produce a gasified fuel, wherein the gasified fuel has a water content of less than 5% by total volume of the gasified fuel.

2. A method for manufacturing a gasified fuel according to claim 1, wherein step (a) further comprises heating the raw fuel to a predetermined temperature to separate the raw fuel into the water layer and the fuel layer.

3. A method for manufacturing a gasified fuel according to claim 2, wherein said water is removed from the raw fuel by adding an emulsion breaker to the raw fuel and heating the raw fuel containing the emulsion breaker.

4. A method for manufacturing a gasified fuel according to claim 2, wherein said raw fuel is heated in the presence of an electric field to effect separation of the raw fuel into the water layer and the fuel layer.

5. A method for manufacturing a gasified fuel according to claim 2, wherein said raw fuel is heated in the presence of both an emulsion breaker and an electric field to effect separation of the raw fuel into the water layer and the fuel layer.

6. A method for manufacturing a gasified fuel according to any one of claims 1–5, wherein said raw fuel is a water emulsion fuel.

7. A method for manufacturing a gasified fuel according to any one of claims 1–5, wherein said raw fuel is a mixture of water, Olinoco tar and a surface active agent.

* * * * *